J. H. SHAW.
DUPLEX CYLINDER LOCK.
APPLICATION FILED APR. 1, 1911.
1,069,734.
Patented Aug. 12, 1913.
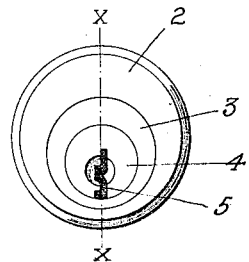
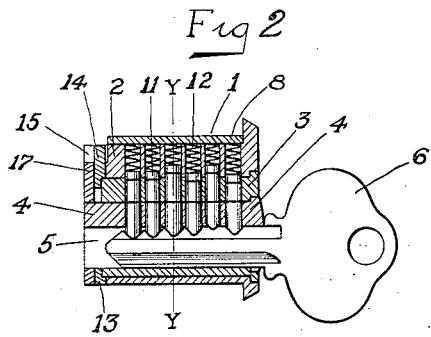
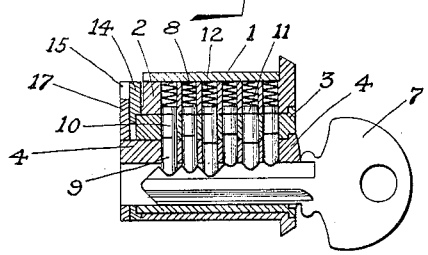
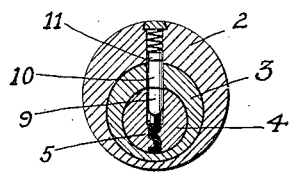
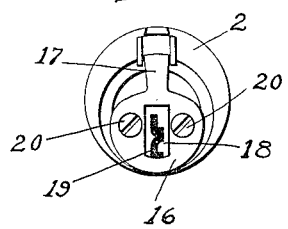
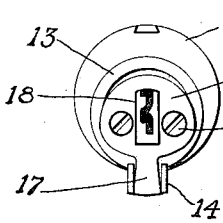
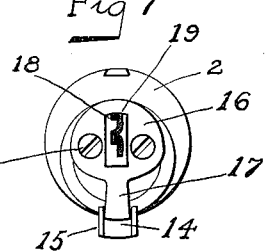
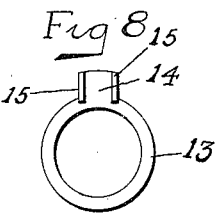
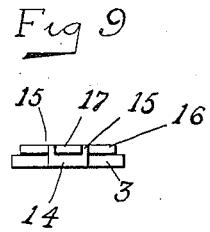
WITNESSES:
F. A. Carlson
M. O. Williams
INVENTOR.
John H. Shaw
BY
Beach & Linhu,
ATTORNEYS.

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

DUPLEX-CYLINDER LOCK.

1,069,734.  Specification of Letters Patent.  Patented Aug. 12, 1913.

Application filed April 1, 1911. Serial No. 618,388.

*To all whom it may concern:*

Be it known that I, JOHN H. SHAW, a citizen of the United States, residing in the city and county of New Haven and State of Connecticut, have invented new and useful Improvements in Duplex-Cylinder Locks, of which the following is a full, clear, and exact description when taken in connection with the accompanying drawings, which form a part thereof, and in which—

Figure 1 represents a front elevation of a lock embodying my invention; Figs. 2 and 3, longitudinal, vertical sections on the line $x$—$x$ of Fig. 1, showing the operation of the lock when keys of different form are used; Fig. 4, a transverse vertical section on the line $y$—$y$ of Fig. 2; Fig. 5, a rear view of the lock with the dog in normal inoperative position; Fig. 6, a similar view showing the dog turned to operative position, by turning the barrel or hub alone; Fig. 7, a similar view showing dog in operative position when both the barrel and sleeve are turned; Fig. 8, a detail plan of the dog member; and Fig. 9, a detail edge view of the dog member and operating member looking toward the end of the dog.

In all figures, similar letters of reference represent like parts.

The principal object of my invention is to provide, in connection with a pin tumbler cylinder lock, having a plurality of rotatable cylindrical members which operate bolt-operating mechanism, strong and efficient operative connection between the said cylindrical members and the bolt-operating mechanism.

With this object in view and to generally improve the operation of such device, my invention consists of the parts and combinations set forth and claimed hereinafter.

Referring to the drawings 1 designates the cylindrical body or casing of a cylinder lock and 2 its face. In the casing 1 is mounted eccentrically a longitudinal cylindrical sleeve 3 capable of rotation within the casing. Within this sleeve is mounted eccentrically to the bore of the sleeve a cylindrical hub or barrel 4. This barrel is provided with a longitudinal slot 5 for the reception of the key 6, or the key 7. The center of the sleeve in the normal inoperative position of the lock is above the center of the barrel. In the body 1 are radial tumbler pockets 8 which extend through the wider part of the sleeve and also in the barrel into the key-slot. Each pocket is provided with tumbler pins built up of three pieces 9, 10 and 11, and with pin-pressing springs 12.

A dog or bit comprising a ring 13 surrounds the end of the sleeve and from this ring extends radially an integral bolt operating projection 14 having a flat outer surface and having shoulders 15 projecting beyond the plane of the said surface and of the ring and forming a guide groove or slot open at both ends. Bearing upon the member 13 and in a plane parallel to but beyond the plane of said member 13 is a dog operating member, consisting of a flat disk-like plate 16 provided with a radial tongue 17. This tongue enters between the shoulders 15 and is adapted to rotate the dog for the purpose of operating the same and the bolt. This tongue is also adapted to have a radial sliding movement in the slot formed by the projecting shoulders. The plate 16 has a central slot 18 engaging an angular head 19 in the end of the cylindrical hub or barrel, and surrounding the key slot. The plate 16 is secured to the end of the barrel or hub by means of screws 20, or other means, and the dog is held loosely on the lock between this plate and the end of the cylinder.

A plurality of keys, such as a key 6, or a key 7, may be used in connection with this lock. One of these, such as 6, will operate the tumblers 9 so that the barrel or hub 4 may be rotated independently of the sleeve 3, while the sleeve is held against rotation in the cylinder. The other key 7 will operate the tumblers so that the barrel 4 and the sleeve 3 will be rotated together within the cylinder 1. Other keys may also be employed, if desired, to rotate the hub or barrel alone or to rotate the barrel and sleeve together, by having the tumbler pins built up of more pieces in well known manner.

The operation of the device is as follows: When the change key 6 is inserted, which key is the one to be used by the occupant of the room to which the lock belongs, the barrel or hub 3 is alone rotated, the separate pieces 10 and 11 of the tumblers racking with the edges of the cylinder and sleeve. In this operation, the disk-like member 16 secured to the end of the barrel or hub will be rotated, the tongue 17 engaging the slot formed by the shoulders 15 of the dog, and thus rotating the dog independently of the sleeve, and protracting and retracting the bolt which the dog is adapted to operate and which is not here shown. Since the barrel or hub 3 is mounted eccentrically to the sleeve with the greater portion of the circle of the sleeve above the center of the hub, in the above described rotation of the hub independently of the sleeve, the tongue 17 will be forced to travel in a relatively shorter path than the bolt operating projection 14, and the consequent radial movement of the tongue relative to the dog is permitted by means of the slot and the loose engagement therewith of the tongue. When the barrel 4 and the sleeve 3 are rotated together, by the insertion and turning of the key 7, the rotation is on the axis of the sleeve 3 so that the dog 13, 14 will rotate with the sleeve 3 and the barrel or hub will maintain the same relative position with respect to the sleeve as when in its normal position, and the centers of the two parts will be the same distance apart as when in such normal position, hence any sliding movement of the tongue in the slot of the dog is unnecessary.

The arrangement of the dog operating plate in a plane parallel to but beyond the plane of the dog carrying ring permits the use of a stronger plate and a tongue of sufficient length to insure at all times its proper engagement with the shoulders of the dog, and to provide a sufficient leverage as well as obviate the necessity of weakening the ring for the reception of the plate and tongue in the plane of the ring.

The shoulders created by the opposite side edges of the projection or tongue 17 coöperate very positively with the corresponding shoulders on the bolt operating projection of the dog. In the form shown, the projection 17 on the operating member lies in the plane of the main part of said operating member and the shoulders 15 of the bolt operating projection extend out of the plane of the main part of the dog and, into the plane of rotation of the projection 17, but, of course, an obvious reversal of this arrangement would be within the scope of my invention. The shoulders 15 form a part of the bolt operating projection and of course their particular form may be considerably varied.

The above described arrangement of the dog and the operating member therefor is of particular advantage in connection with a cylinder lock in which the sleeve and barrel are eccentric to each other, but in the broader aspects of the invention I do not limit myself to this feature. Neither do I limit myself to a construction in which the dog and operating member are incapable of rotary or turning movement relatively to each other inasmuch as my invention provides improved means for rotating the dog in a single direction by the rotary movement of the operating member.

Various modifications of the particular embodiment of my invention, which is here shown and described, may be adopted with the scope of the claims.

Having now described my invention, what I claim and desire to secure by Letters Patent, is:—

1. In a cylinder lock, the combination of a bolt operating dog and an operating member therefor, rotatable in parallel planes, said dog and member having integral means for interlocking them so that they rotate together but have independent radial movement; substantially as described.

2. In a cylinder lock, the combination with a casing, a rotary sleeve therein, and a rotary barrel within the sleeve, of a dog operating member secured to the rear end of the barrel and having a projection in the plane thereof presenting shoulders at the opposite sides, and a dog loosely mounted between said operating member and the rear end of the casing and having a bolt operating projection extending out of the plane of the main part of the dog into the plane of rotation of said shoulders; substantially as described.

3. In a cylinder lock, the combination with a casing, a rotary sleeve therein, and a rotary barrel within the sleeve, of a dog loosely mounted with respect to the sleeve and having a bolt operating projection presenting shoulders at opposite sides, and an operating member for said dog secured to said barrel to rotate in a plane parallel to the plane of rotation of said dog, said operating member having means extending into the plane of and adapted to coöperate with the respective shoulders of said bolt operating projection; substantially as described.

4. In a cylinder lock, the combination of a dog and an operating member therefor, rotatable in parallel planes, one of said parts having a tongue, and the other part having shoulders confining the tongue laterally but permitting independent radial movement thereof; substantially as described.

5. In a cylinder lock, the combination with a casing, a rotary sleeve therein, and a rotary barrel within the sleeve, of a dog loosely mounted with respect to the sleeve, an operating member for said dog rotatable in a plane parallel to the plane of rotation of said dog, means for securing said operating member to said barrel, and means independent of said securing means to interlock said dog and operating member; substantially as described.

6. In a cylinder lock, the combination with a casing, a rotary sleeve therein, and a rotary barrel within the sleeve, of a dog loosely mounted with respect to the sleeve and having a bolt operating projection presenting a shoulder, an operating member for said dog rotatable in a plane parallel to the plane of rotation of said dog, means for securing said operating member to said barrel, and a projection on said operating member extending into the plane of rotation of said shoulder, whereby said dog is rotated by said operating member; substantially as described.

7. In a lock, a bolt operating dog and a key operated member rotatable in parallel planes, said member having a radial tongue and said dog having shoulders projecting into the plane of rotation of the tongue, between which shoulders the tongue freely projects, substantially as described.

8. In a lock, in combination with a casing, a ring rotatably mounted thereon, a bolt operating projection extending radially from the edge, and shoulders projecting beyond the rotative plane of the ring, a separate disk-like member bearing on the outside face of said ring and having a radial tongue in constant engagement with the slot formed by said shoulders, and key operated means for rotating said disk-like member, substantially as described.

9. In a lock, in combination with a casing, a rotary barrel or hub, a sleeve loosely mounted in said casing to rotate therein, a bolt-operating dog rotatable independently of said sleeve, a member secured to said barrel or hub beyond the plane of said dog and having a radial tongue to rotatively engage the latter, and tumbler mechanism in said casing, sleeve and barrel or hub adapted to permit the rotation of said barrel or hub separately from said sleeve, substantially as described.

10. In a lock, in combination with a casing, a rotary barrel or hub, a sleeve loosely mounted in said casing to rotate therein, a bolt-operating dog member loosely mounted on said sleeve and having an open ended radial slot and a member on the barrel or hub mounted outside of the dog member and having a radial tongue to engage, and tumbler mechanism for locking said sleeve and barrel or hub to rotate together or separately, substantially as described.

11. In a cylinder lock, the combination with a casing, a rotary sleeve therein and a rotary barrel within the sleeve, of a dog loosely mounted with respect to the sleeve and having a bolt operating projection presenting shoulders at opposite sides, an operating member for said dog secured to the end of the barrel, and a projection on said operating member presenting shoulders extending into the plane of and adapted to engage the respective first named shoulders; substantially as described.

12. In a cylinder lock, the combination with a casing, a rotary sleeve therein and a rotary barrel within the sleeve, of a dog comprising a body portion loosely mounted with respect to the sleeve, and a bolt operating projection having shoulders extending out of the plane of said body portion, an operating member for said dog secured to the end of the barrel, and a projection on said operating member in the plane thereof having opposite side portions to engage the respective shoulders of said dog; substantially as described.

In witness whereof I have hereunto set my hand on the 27 day of March, 1911.

JOHN H. SHAW.

Witnesses:
 BURTON S. BROCKETT,
 BERTHA RAY.

---

Copies of this patent may be obtained for five cents each, by addressing the "Commissioner of Patents, Washington, D. C."